(12) United States Patent
Sugihara et al.

(10) Patent No.: US 7,800,710 B2
(45) Date of Patent: Sep. 21, 2010

(54) IMAGE DISPLAY APPARATUS AND IN-VEHICLE IMAGE DISPLAY APPARATUS

(75) Inventors: Ryohei Sugihara, Hachioji (JP); Yoichi Iba, Hachioji (JP)

(73) Assignee: Olympus Corporation, Tokyo (JP)

( * ) Notice: Subject to any disclaimer, the term of this patent is extended or adjusted under 35 U.S.C. 154(b) by 943 days.

(21) Appl. No.: 11/630,743

(22) PCT Filed: Jun. 24, 2005

(86) PCT No.: PCT/JP2005/011640

§ 371 (c)(1),
(2), (4) Date: Dec. 21, 2006

(87) PCT Pub. No.: WO2006/001383

PCT Pub. Date: Jan. 5, 2006

(65) Prior Publication Data

US 2008/0285306 A1 Nov. 20, 2008

(30) Foreign Application Priority Data

Jun. 24, 2004 (JP) ............................. 2004-196286

(51) Int. Cl.
*G02F 1/1335* (2006.01)
(52) U.S. Cl. ....................................................... 349/65
(58) Field of Classification Search ................... 349/65
See application file for complete search history.

(56) References Cited

U.S. PATENT DOCUMENTS 6,011,602 A 1/2000 Miyashita et al.
(Continued)

FOREIGN PATENT DOCUMENTS

JP 05-107663 4/1993
(Continued)

OTHER PUBLICATIONS

Notification Concerning Transmittal of International Preliminary Report on Patentability, Chapter I of the Patent Cooperation Treaty, and Written Opinion of the International Searching Authority, Dated Jan. 11, 2007, for PCT/JP2005/011640, 6 sheets.

(Continued)

*Primary Examiner*—James A Dudek
(74) *Attorney, Agent, or Firm*—Frishauf, Holtz, Goodman & Chick, P.C.

(57) ABSTRACT

An image display apparatus has one display screen configured to display images corresponding to a plurality of observers. The image display apparatus includes illumination unit for emitting a first light flux and a second light flux in at least two different directions in a time sharing manner, and a transmissive display element configured to display in a time sharing manner a first image using the first light flux as illumination light and a second image using the second light flux as illumination light. The illumination unit includes a first light source which emits the first light flux, a second light source which emits the second light flux, a first light guiding plate which projects the first light flux only in a direction to a first observer, and a second light guiding plate which projects the second light flux only in a direction to a second observer.

16 Claims, 13 Drawing Sheets

U.S. PATENT DOCUMENTS 6,879,354 B1    4/2005  Sawayama et al.
2006/0250544 A1*  11/2006  Ohkawa ..................... 349/65

FOREIGN PATENT DOCUMENTS

| JP | 10-326515 A | 12/1998 |
| JP | 11-273438 A | 10/1999 |
| JP | 3072866 B2 | 6/2000 |
| JP | 2001-66547 A | 3/2001 |
| JP | 2001-92370 A | 4/2001 |
| JP | 2001-513939 A | 9/2001 |
| JP | 2004-152496 A | 5/2004 |
| WO | WO 97/17631 A1 | 5/1997 |
| WO | WO 98/39598 A1 | 9/1998 |

OTHER PUBLICATIONS

Kaihatsu No. 0324 News Release (dated Sep. 30, 2003); by Mitsubishi Electric COrporation.

Chinese Office Action dated Jan. 8, 2010 and English translation thereof issued in a counterpart Chinese Application No. 200810174282.1.

* cited by examiner

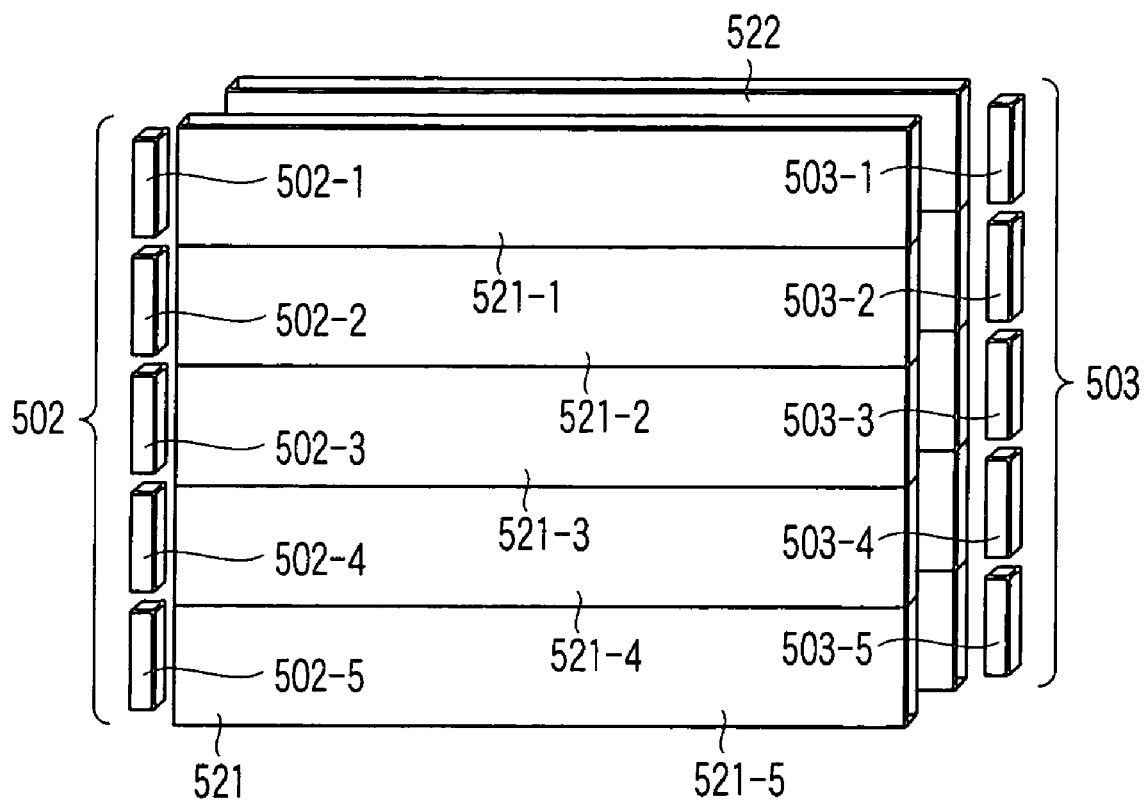
F I G. 18

(A)

(B)

120
IMAGE DISPLAY APPARATUS AND IN-VEHICLE IMAGE DISPLAY APPARATUS

This application is a U.S. National Phase Application under 35 USC 371 of International Application PCT/JP2005/ filed Jun. 24, 2005.

TECHNICAL FIELD

The present invention relates to an image display apparatus and an in-vehicle image display apparatus.

BACKGROUND ART

An image display apparatus has heretofore been known which has one display surface and by which images corresponding to viewing directions can be observed. For example, Japanese Patent No. 3072866 has disclosed a stereoscopic display apparatus using matrix-like illumination, a lenticular, etc. as a technique for switching the directivity of illumination in a time sharing manner in displaying images in accordance with the viewing directions.

(A) and (B) of FIG. 19 are diagrams showing one example of the configuration of a conventional image display apparatus, wherein time sharing illumination is carried out by the combination of a light source group 100 composed of divided light sources L1, R1 to L3, R3 such as striped light sources and matrix-like light sources, and a lenticular 101 as a light diffusing element composed of lenses 1 to 3. In (A) of FIG. 19, among L1, R1 to L3, R3, the light sources of R1 to R3 are turned on, while the light sources of L1 to L3 are turned off. In (B) of FIG. 19, among L1, R1 to L3, R3, the light sources of L1 to L3 are turned on, while the light sources of R1 to R3 are turned off.

Owing to the lens function of the lenticular 101, the light sources R can only be observed when viewed from an observer located on the right side in the case of (A) of FIG. 19, while the light sources L can only be observed when viewed from an observer located on the left side. Thus, the light sources R and L are alternately turned on, and the display of a transmissive display element is switched between right-side display and left-side display accordingly, such that the observer on the right side can only observe right-side images, while the observer on the left side can only observe left-side images.

FIG. 20 is a diagram showing another example of the configuration of a conventional image display apparatus, which has been disclosed in, for example, Kaihatsu No. 0324, News Release (dated Sep. 30, 2003) by Mitsubishi Electric Corporation. This configuration is designed for stereoscopic display of a type called scan backlight, wherein a double-sided prism sheet 151 is disposed in the rear of a liquid crystal display element 150, and a light guiding plate 153 is disposed in the rear of the double-sided prism sheet 151. A first light source 152-1 and a second light source 152-2 are disposed at both ends of the light guiding plate 153. In the double-sided prism sheet 151, a front surface 151-1 has a lenticular structure, and a rear surface 151-2 has a prism structure. The light guiding plate 153 can change directivity by turning on/off the first light source 152-1 and the second light source 152-2. Owing to such a configuration, illumination light is caused to enter the right and left eyes of the observer in a time sharing manner, and images corresponding to the right and left eyes (a right eye image 154-1 and a left eye image 154-2) are displayed, thereby achieving the stereoscopic display. In FIG. 20, 155-1 denotes a first light source image, and 155-2 denotes a second light source image.

DISCLOSURE OF INVENTION

However, in the time sharing illumination type stereoscopic display apparatus disclosed in Japanese Patent No. 3072866, the range which enables proper observation is narrow, and there has been a problem that especially when, for example, an observer on the right side has moved an observing position more to the right side during observation of an image on the right side, an image on the left side which is the image in the opposite direction is visible.

This problem will hereinafter be described in detail. FIG. 21 shows a situation where an observation is made further outside the observing position in (A) of FIG. 19. FIG. 22 is a diagram showing what kind of image can be seen depending on the difference of observing positions in the conventional configuration. In FIG. 22, an observation area is ideally separated into a first (left-side) image observation area 602 and a second (right-side) image observation area 601 from the center. However, as shown in FIG. 22, further outside the second image observation area 601, there is an area 600 where images for a first observer are visible, and crosstalk is caused in this area. In contrast, further outside the first image observation area 602, there is an area 603 where images for a second observer are visible, and crosstalk is caused in this area.

Furthermore, in an optical system using a lenticular, when right and left images are to be separated with a large angle, the focal distance has to be decreased, and the curvature is extremely increased, which entails an increased influence of aberration, so that there has also been a problem that the influence of the crosstalk increases accordingly.

On the other hand, in a scan backlight method, two light sources 152-1 and 152-2 correspond to one light guiding plate 153, and the right and left directivities are switched by turning on/off the respective light sources 152-1 and 152-2. Thus, the light guiding plate 153 has to have a structure subjected to a uniform surface treatment or a symmetrical structure, and there is a difference of illumination intensity between a part near the light sources 152-1 and 152-2 and a part far from the light sources 152-1 and 152-2, which appears as the unevenness of illumination, so that there has been a problem that the influence of the unevenness is greater especially in larger display images. Moreover, the light guiding plate for a backlight used in an ordinary display panel has an asymmetrical structure to suppress the unevenness of illumination.

Furthermore, there have been problems such as limited light emission time and easily caused crosstalk when the directivity of a surface light source whose size is equal to the size of a screen is collectively switched, due to "raster scan" which is a driving method used in the ordinary display panel and due to "hold characteristics" as the display characteristics of a liquid crystal panel in which the display of an image of each pixel is continued for a given period (e.g., ⅟60 second).

The present invention has been made to solve the problems described above, and is directed to provide an image display apparatus and an in-vehicle image display apparatus capable of obtaining high-quality images with a little crosstalk and a little unevenness of illumination at low cost.

To obtain the above object, according to a first aspect of the present invention, there is provided an image display apparatus having one display screen configured to display images corresponding to a plurality of observers, the apparatus comprising:

illumination means for emitting a first light flux and a second light flux in at least two different directions in a time sharing manner; and a transmissive display element configured to display in a time sharing manner a first image using the first light flux emitted from the illumination means as illumination light and a second image using the second light flux as illumination light, wherein the illumination means includes:

a first light source which emits the first light flux;

a second light source which emits the second light flux;

a first light guiding plate which projects the first light flux emitted from the first light source only in a direction to the first observer; and a second light guiding plate which projects the second light flux emitted from the second light source only in a direction to the second observer.

According to a second aspect of the present invention, there is provided an image display apparatus according to the first aspect, wherein the first light guiding plate is disposed between the transmissive display element and the second light guiding plate, and the second light flux projected from the second light guiding plate is transmitted through the first light guiding plate.

According to a third aspect of the present invention, there is provided an image display apparatus according to the second aspect, wherein a surface of the first light guiding plate facing the transmissive display element and a surface thereof facing the second light guiding plate are provided with optically flat parts for the second light flux projected from the second light guiding plate and transmitted through the first light guiding plate.

According to a fourth aspect of the present invention, there is provided an image display apparatus according to the first aspect, wherein a rear surface of the first light guiding plate is provided with:

a plurality of flat surface portions which totally internally reflect incident light from the first light source to convey the incident light to an end face of the first light guiding plate opposite to the first light source;

a plurality of slope portions which totally internally reflect the incident light from the first light source so that conditions of the total internal reflection in a front surface of the first light guiding plate are not satisfied and which project the incident light in the direction to the first observer.

According to a fifth aspect of the present invention, there is provided an image display apparatus according to the first aspect, wherein a front surface of the first light guiding plate is provided with:

a plurality of flat surface portions which totally internally reflect incident light from the first light source to convey the incident light to an end face of the first light guiding plate opposite to the first light source;

a plurality of exit surfaces which transmit the incident light from the first light source so that the incident light exit in the direction to the first observer.

According to a sixth aspect of the present invention, there is provided an image display apparatus according to the fourth aspect, wherein an angle θ between the slope portion and the flat surface portion satisfies a condition:

$$n \cdot \cos 2\theta < 1 (\theta < 45 \text{ degrees})$$

where n is the refractive index of the first light guiding plate.

According to a seventh aspect of the present invention, there is provided an image display apparatus according to the fifth aspect, wherein the front surface of the first light guiding plate is provided with:

a plurality of rectangular grooves.

According to an eighth aspect of the present invention, there is provided an image display apparatus according to the seventh aspect, wherein the depth of the rectangular grooves increases as the distance increases from the first light source.

According to a ninth aspect of the present invention, there is provided an image display apparatus according to the first aspect, wherein the second light guiding plate has a shape different from that of the first light guiding plate or has a surface shape with a periodic structure different from that of the first light guiding plate.

According to a tenth aspect of the present invention, there is provided an image display apparatus according to the first aspect, wherein the second light guiding plate has the same shape as that of the first light guiding plate, and the first light guiding plate and the second light guiding plate are disposed so that they are horizontally reverse to each other.

According to an eleventh aspect of the present invention, there is provided an image display apparatus according to the tenth aspect, wherein the first light source and the second light source are disposed at end face positions horizontally different when viewed from the side of the observers.

According to a twelfth aspect of the present invention, there is provided an image display apparatus according to the first aspect, wherein the first light source and the second light source periodically generate light at different times, and the frequency of the light generated by each of the light sources is 24 Hz or more.

According to a thirteenth aspect of the present invention, there is provided an image display apparatus according to the first aspect, wherein a light absorbing member is disposed in the rear of the second light guiding plate.

According to a fourteenth aspect of the present invention, there is provided an image display apparatus according to the first aspect, wherein a plurality of light emitting elements are disposed adjacently to the first light guiding plate and the second light guiding plate along a raster scan direction of the transmissive display element, each of the light emitting elements is individually controlled for light emission.

According to a fifteenth aspect of the present invention, there is provided an image display apparatus according to the fourteenth aspect, wherein each of the light emitting elements periodically emits light synchronously with a raster scan by the transmissive display element.

According to a sixteenth aspect of the present invention, there is provided an image display apparatus according to the fourteenth aspect, wherein the first light guiding plate and the second light guiding plate are divided into a plurality of light guiding portions to correspond to the plurality of light emitting elements.

According to a seventeenth aspect of the present invention, there is provided an in-vehicle image display apparatus which is installed in a vehicle and which has one display screen configured to display images corresponding to a plurality of observers, the apparatus comprising:

illumination means for emitting a first light flux and a second light flux in at least two different directions in a time sharing manner; and a transmissive display element configured to display in a time sharing manner a first image using the first light flux emitted from the illumination means as illumination light and a second image using the second light flux as illumination light, wherein the illumination means includes:

a first light source which emits the first light flux;

a second light source which emits the second light flux;

a first light guiding plate which projects the first light flux emitted from the first light source only in a direction to an observer on the side of a driver's seat; and a second light guiding plate which projects the second light flux emitted from the second light source only in a direction to an observer on the side of a passenger seat.

BRIEF DESCRIPTION OF DRAWINGS

FIG. 18 is a diagram showing a modification (No. 2) of the illumination means;

BEST MODE FOR CARRYING OUT THE INVENTION

Figure 1:
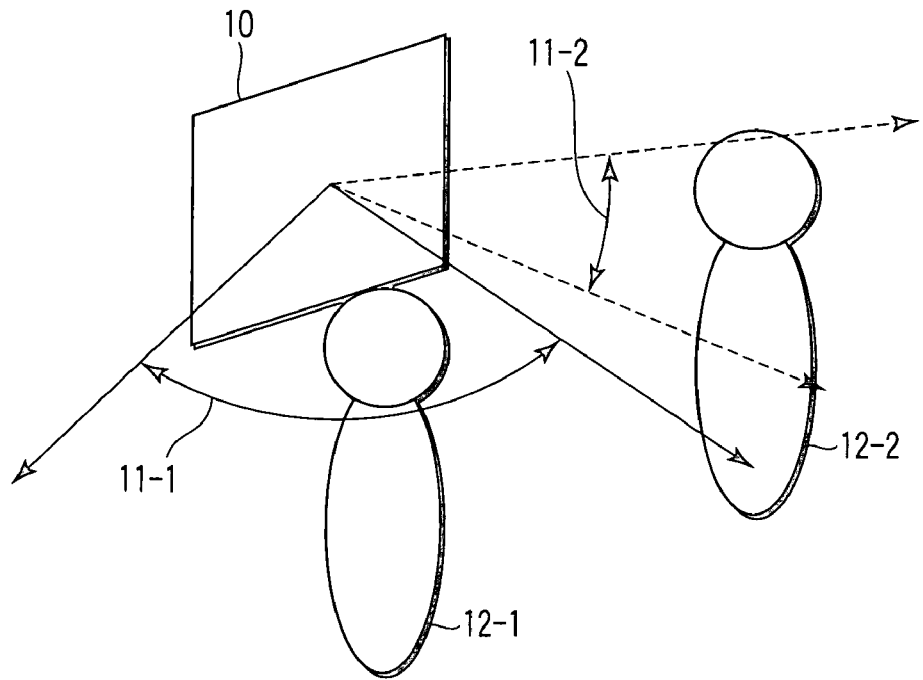
FIG. 1 is a diagram for explaining one example of the use of an image display apparatus of the present invention.

Embodiments of the present invention will hereinafter be described in detail with reference to the drawings. FIG. 1 is a diagram for explaining one example of the use of an image display apparatus of the present invention. A first observer 12-1 who observes a display screen 10 from left is located in front of one display screen 10 on the right, and a second observer 12-2 who observes the display screen 10 from right is located in front of the display screen 10 on the left. The first observer 12-1 is located in a first image observation range 11-1 and observes a first image, and the second observer 12-2 is located in a second image observation range 11-2 and observes a second image, so that both of them can observe at the same time.

Figure 2:
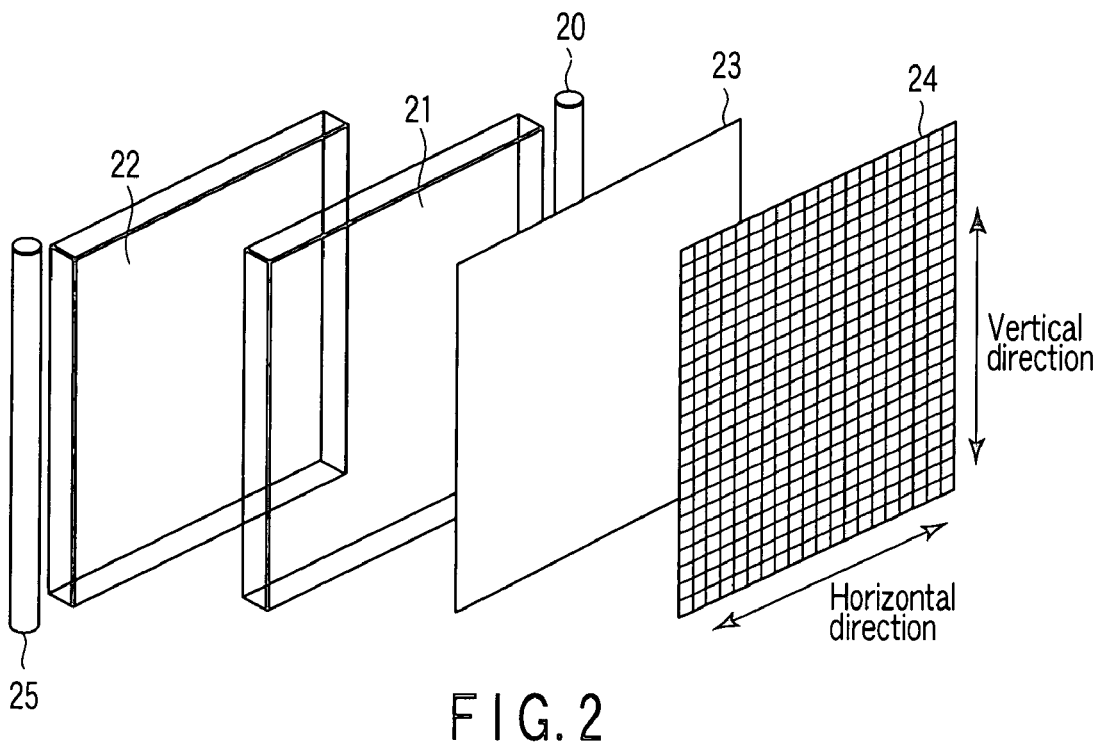
FIG. 2 is a diagram showing a basic configuration of the image display apparatus according to the present invention.

FIG. 2 is a diagram showing a basic configuration of the image display apparatus according to the present invention, wherein there are arranged, in order from the position of the observer, a transmissive display element 24, a light diffusing element 23, a first light guiding plate 21 and a second light guiding plate 22. Thus, in the configuration of the present embodiment, the first light guiding plate 21 and the second light guiding plate 22 are stacked. Further, a first light source 20 is disposed adjacently to one end of the first light guiding plate 21, and a second light source 25 is disposed adjacently to an end of the second light guiding plate 22 which is opposite to the above-mentioned one end. That is, the first light source 20 and the second light source 25 are disposed at the positions on horizontally different sides of the first light guiding plate 21 and the second light guiding plate 22.

The light diffusing element 23 is disposed between the first light guiding plate 21 and the transmissive display element 24 to reduce the unevenness of illumination, etc. Here, an image is separated to have two directivities in a horizontal direction, so that if the diffusion in the horizontal direction is too strong, two images are mixed and might look as a double image. Therefore, it is preferable here to use a light diffusing element in which diffusion is suppressed in the horizontal direction rather than vertical direction. Specifically, it is desirable that a diffusion intensity distribution in the horizontal direction be equal to or less than a degree of 30 in full angle at half maximum.

Furthermore, the first light guiding plate 21 and the second light guiding plate 22 have a configuration in which there are provided special grooves, slants and protrusions in transparent members, so that light entering from the side is projected only in directions with directivities. The first light source 20 and the second light source 25 may be any light sources as long as illumination is achieved from one direction of the first light guiding plate 21 and the second light guiding plate 22, and they may be columnar light sources such as cold-cathode tubes, or light sources such as LEDs may be used so that they are arranged side by side.

Figure 3:
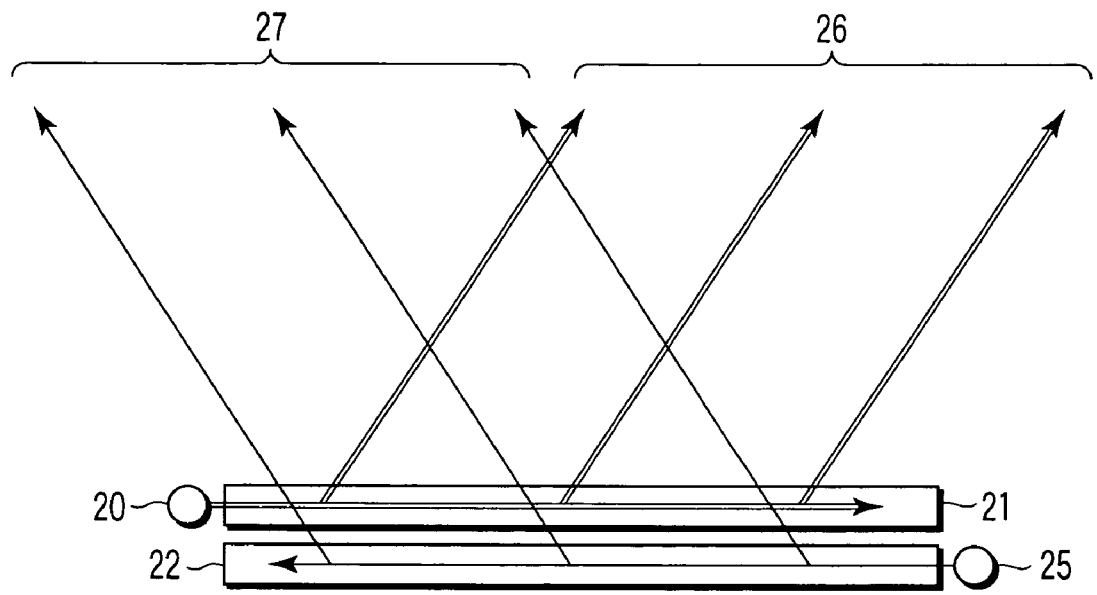
FIG. 3 is a horizontal sectional view of illumination means of the image display apparatus according to the present invention.

FIG. 3 is a horizontal sectional view of illumination means of the image display apparatus according to the present invention. The first light guiding plate 21 and the second light guiding plate 22 are arranged in a stacked state. The first light source 20 is disposed adjacently to one end (left end in the drawing) of the first light guiding plate 21, and the second light source 25 is disposed adjacently to an end (right end in the drawing) of the second light guiding plate 22 opposite to the one end (left end) of the first light guiding plate 21. Thus, in the present embodiment, there is a difference between the first light guiding plate 21 and the second light guiding plate 22 as to the positions where the first light source 20 and the second light source 25 are disposed.

Hereinafter, it is assumed that a direction in which the position of the observer is approached (upward direction in the drawing) is the forward direction. Light entering the first light guiding plate 21 from the first light source 20 travels while being totally internally reflected within the first light guiding plate 21, and the surface of the first light guiding plate 21 or a part thereof can be subjected to a special surface treatment or this surface can be provided with a special shape such that the light exiting from the first light guiding plate 21 illuminates as first image illumination 26 only in the direction to the first observer. On the other hand, light entering the second light guiding plate 22 from the second light source 25 travels while being totally internally reflected within the second light guiding plate 22, and the surface of the second light guiding plate 22 or a part thereof can be subjected to a special surface treatment or this surface can be provided with a special shape such that the light exiting from the second light guiding plate 22 illuminates as second image illumination 27 only in the direction to the second observer. As to the relation between the first light guiding plate 21 and the second light guiding plate 22, any one of them may be disposed before.

Figure 4:
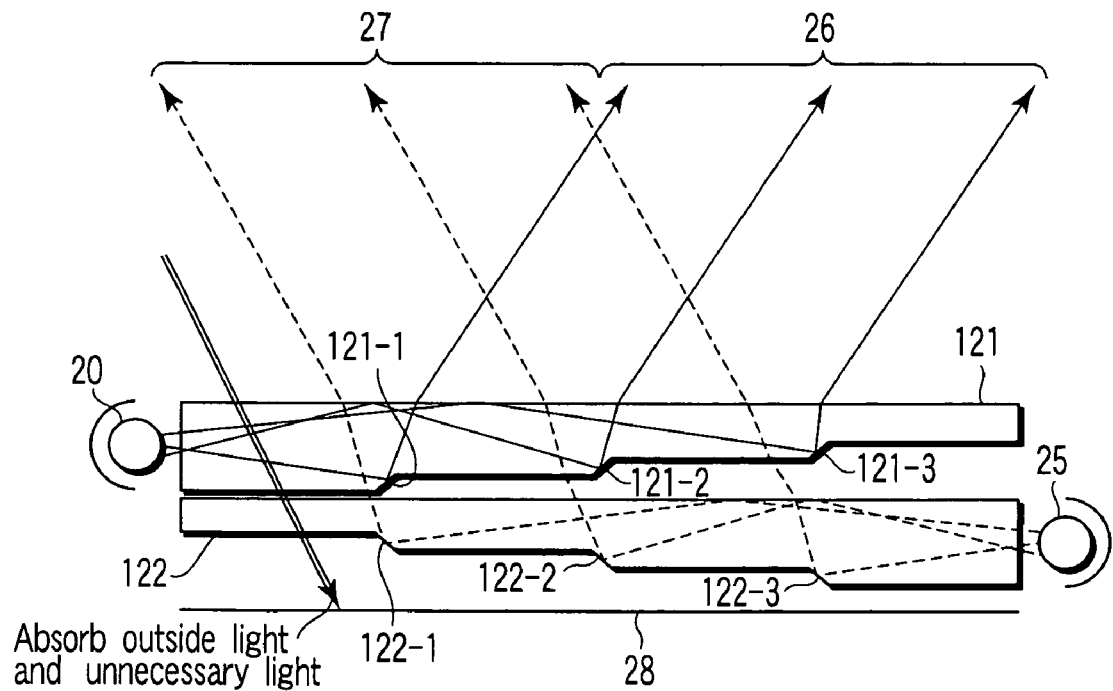
FIG. 4 is a schematic diagram showing a specific sectional structure of the illumination means according to a first embodiment of the present invention.

FIG. 4 is a schematic diagram showing a specific sectional structure of the illumination means according to a first embodiment of the present invention. Here, as in the configuration of FIG. 3, a first light guiding plate 121 and a second light guiding plate 122 are arranged in a stacked state, there is a difference between the first light guiding plate 121 and the second light guiding plate 122 as to the positions where the first light source 20 and the second light source 25 are disposed.

Furthermore, in the rear surfaces of the light guiding plates 121 and 122, a plurality of slope portions 121-1 to 121-3 are provided to extend in the shape of streaks at predetermined intervals, and form step-like portions. The first light guiding plate 121 and the second light guiding plate 122 are the same in shape, but are different in a horizontal direction. A light absorbing member 28 for absorbing outside light and unnecessary light is disposed in the rear of the second light guiding plate 122.

Light exiting from the first light source 20 enters the first light guiding plate 121, and travels while repeating total internal reflection on the front and rear surfaces of the first light guiding plate 121, but the light totally internally reflected by the slope portions 121-1 to 121-3 is reflected forward at a steeper angle than the light totally internally reflected by the horizontal surface of the first light guiding plate 121, so that conditions for the total internal reflection are not satisfied in the front surface of the first light guiding plate 121. Therefore, the light illuminates as the first image illumination 26 in a first observation direction.

On the other hand, light exiting from the second light source 25 enters the second light guiding plate 122, and travels while repeating total internal reflection on the front and rear surfaces of the second light guiding plate 122, but the light totally internally reflected by the slope portions 121-1 to 121-3 is reflected forward at a steeper angle than the light totally internally reflected by the horizontal surface of the second light guiding plate 122, so that conditions for the total internal reflection are not satisfied in the front surface of the second light guiding plate 122. Therefore, the light illuminates as the second image illumination 27 in a second observation direction.

The second image illumination 27 derived from the second light source 25 passes through the first light guiding plate 121 halfway, and has the same effects in most parts other than the slope portions 121-1 to 121-3 as when passing through a parallel plane plate, so that a final exit angle does not change. Moreover, an angle of the second image illumination 27 when entering the slope portions 121-1 to 121-3 of the first light guiding plate 121 changes in a direction to the outside of a second observation position, that is, in a direction opposite to a first observation direction, so that there is no influence on crosstalk, etc.

Since the drawing is schematic, three slopes are only drawn on one side, but four or more slopes are actually disposed at a predetermined pitch.

Figure 5:
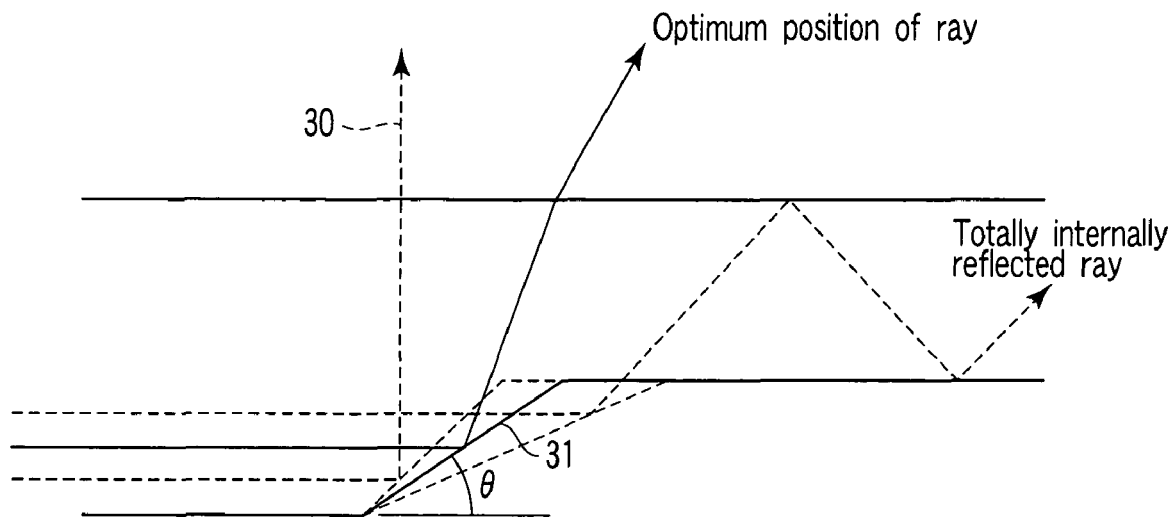
FIG. 5 is a diagram showing a slope portion of a light guiding plate in an enlarged manner.

FIG. 5 is a diagram showing in an enlarged manner the slope portion of the light guiding plate explained with FIG. 4. Conditions for introducing a proper angle θ of the slope portion are introduced below. A vertically exiting ray 30 in FIG. 5 which is a boundary between a first observation area and a second observation area is a boundary having no crosstalk because the light guiding plate in FIG. 5 is configured to illuminate in the first observation direction when horizontally entering light is set as a reference. The angle θ of a slope portion 31 at this point is 45 degrees.

Furthermore, if the ray reflected by the slope portion 31 satisfies the conditions of the total internal reflection at the front surface of the light guiding plate, the ray can not exit from the light guiding plate. Thus, a condition of the angle of the slope portion 31 is obtained for the limit of the total internal reflection:

$$n \cdot \sin(90 - 2\theta) < 1, \text{ that is, } n \cdot \cos 2\theta < 1$$

wherein n is the refractive index.

In addition, if n=1.5, θ=24.1, which is about 24 degrees.

It is understood from what has been described above that, in order to efficiently illuminate the first observation direction and the second observation direction with no crosstalk, the angle θ of the slope portion 31 has to satisfy the conditions:

$$\theta < 45 \text{ degrees, } n \cdot \cos 2\theta < 1.$$

It is more desirable that this angle satisfy 30 degrees<θ<40 degrees. It is still more desirable that this angle satisfy 34 degrees<θ<38 degrees.

Figure 6:
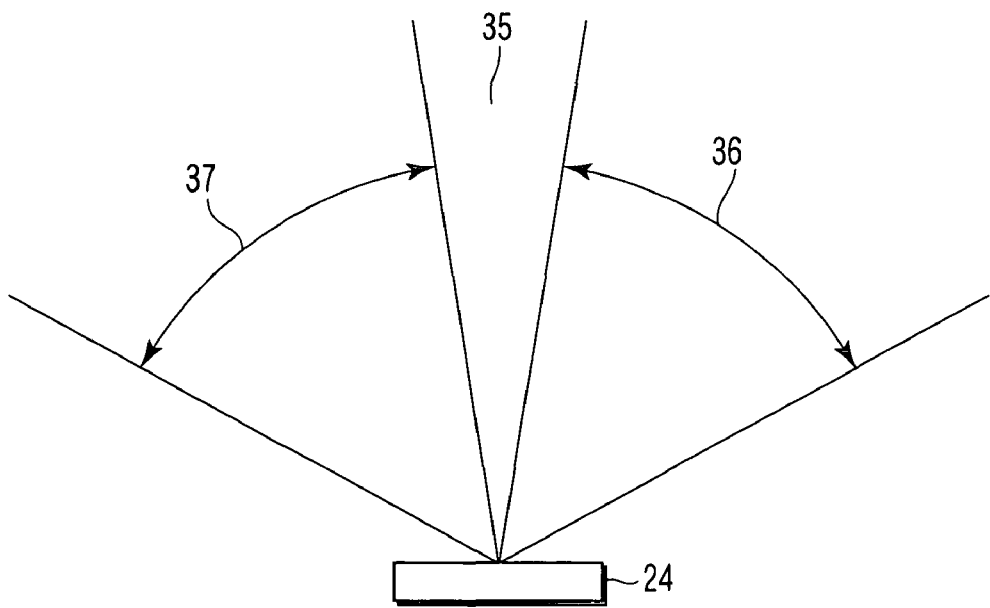
FIG. 6 is a diagram for explaining a viewing angle when the configuration of the present invention is used.
Figure 22:
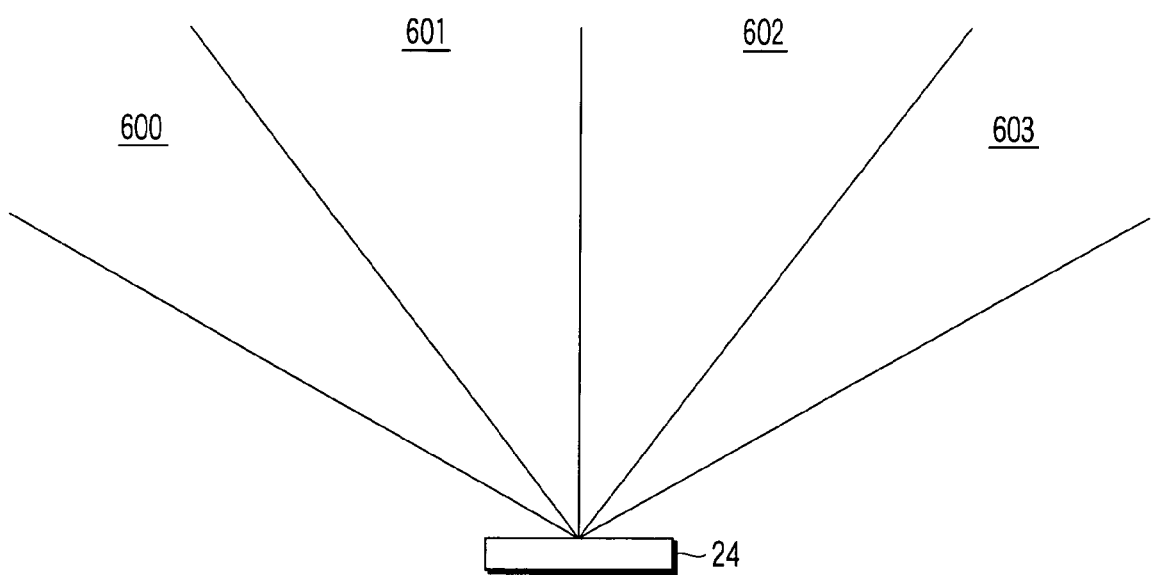
FIG. 22 is a diagram showing what kind of image can be seen depending on the difference of observing positions in the conventional configuration.

FIG. 6 is a diagram for explaining a viewing angle when the configuration of the present invention is used. FIG. 6 shows what kind of image is observed depending on the difference of observing positions. An observation area is separated into a first (left-side) observer area 36 and a second (right-side) observer area 37 from a central area 35. As apparent from the comparison with FIG. 22, there is no crosstalk of images for the second observer on the side of the whole first observer area 36 from the central area 35, and there is no crosstalk of images for the first observer on the side of the whole second observer area 37 from the central area 35.

Figure 7:
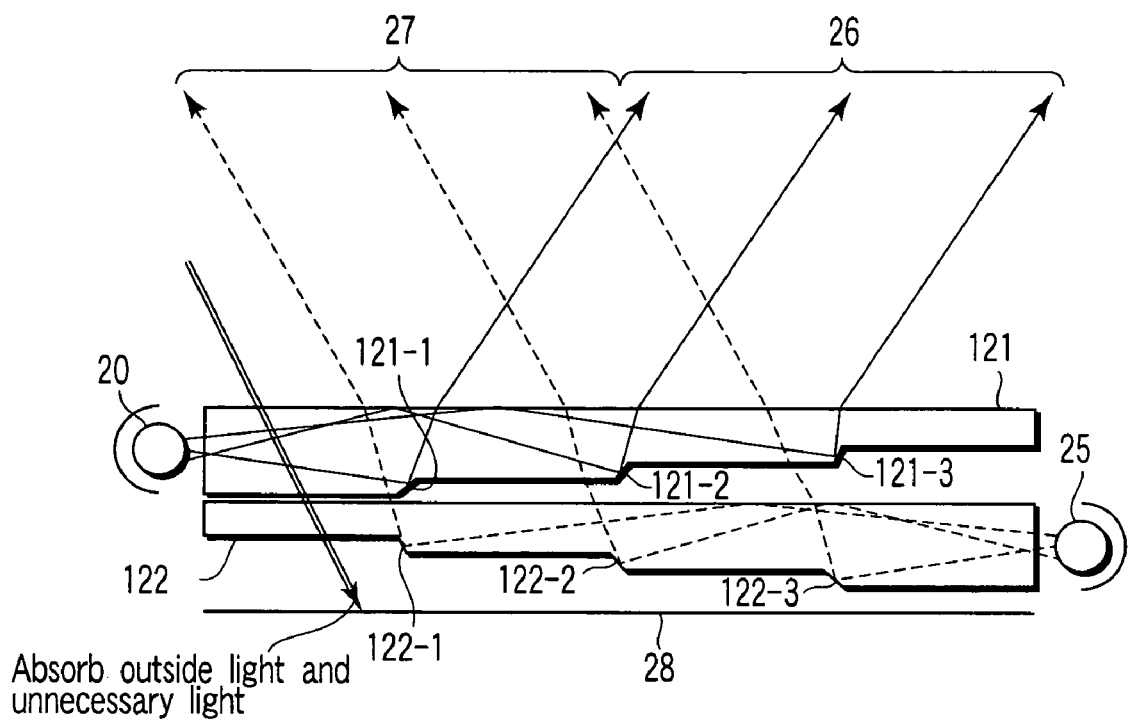
FIG. 7 is a diagram showing a modification of the configuration explained with FIG. 4.

FIG. 7 is a diagram showing a modification of the configuration explained with FIG. 4. This configuration is characterized in that the angles of the slope portions 121-1 to 121-3 of the first light guiding plate 121 increase as the distance increases from the first light source 20. In the same manner, the angles of the slope portions 122-1 to 122-3 of the second light guiding plate 122 increase as the distance increases from the second light source 25.

Figure 8:
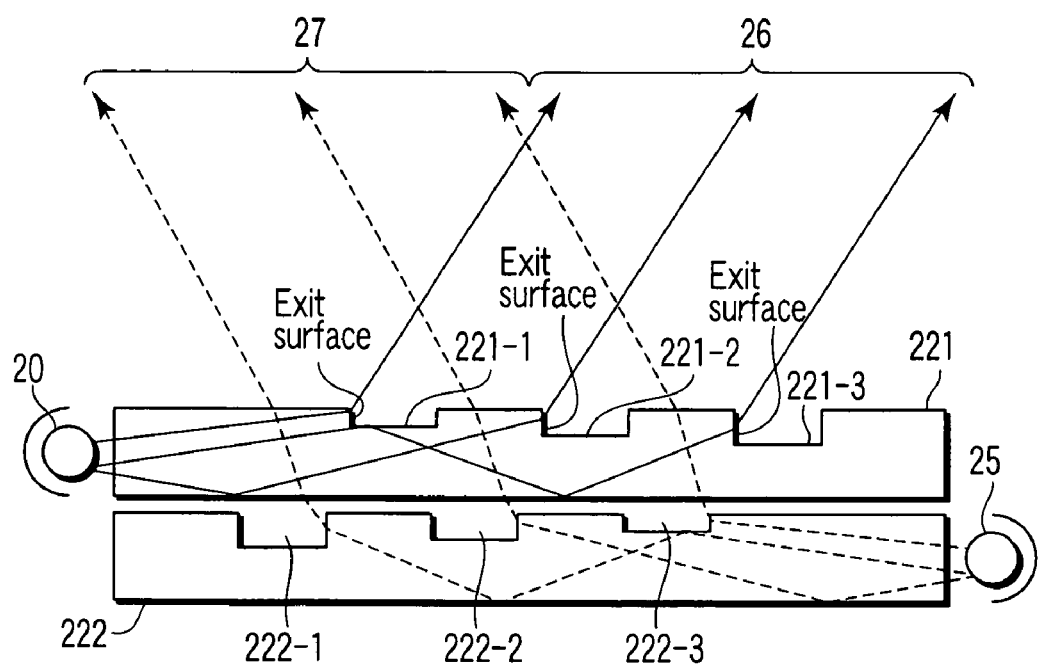
FIG. 8 is a schematic diagram showing a specific sectional structure of illumination means according to a second embodiment of the present invention.

FIG. 8 is a schematic diagram showing a specific sectional structure of illumination means according to a second embodiment of the present invention. Here, as in the configuration of FIG. 3, a first light guiding plate 221 and a second light guiding plate 222 are arranged in a stacked state, there is a difference between the first light guiding plate 221 and the second light guiding plate 222 as to the positions where the first light source 20 and the second light source 25 are disposed. Further, a plurality of grooves 221-1 to 221-3 and 222-1 to 222-3 are provided in the front surfaces of the light guiding plates 221 and 222, respectively.

Light exiting from the first light source 20 enters the first light guiding plate 221 from the end face of the first light guiding plate 221. Since the conditions of the total internal reflection are satisfied in the front and rear surfaces of the first light guiding plate 221, the light that has entered travels to an end face side opposite to the first light source 20 while repeating the total internal reflection. The plurality of grooves 221-1 to 221-3 and 222-1 to 222-3 are provided in the front surface of the first light guiding plate 221, light that has entered a surface substantially vertical to the front and rear surfaces of the first light guiding plate 221 does not satisfy the conditions of the total internal reflection, and exits to the outside of the first light guiding plate 221. In the first light guiding plate 221, light only enters the vertical surfaces of the grooves 221-1 to 221-3 on the side of the first light source 20, so that exiting light does not travel in the second observation direction and becomes illumination light having a directivity for only illuminating the first observation direction.

Effects when the light exiting from the second light source 25 enters the second light guiding plate 222 are the same as described above, but this light only illuminates the second observation direction because the second light guiding plate 222 is disposed symmetrically to the first light guiding plate 221. At this point, the light exiting from the second light guiding plate 222 passes through the first light guiding plate 221, but the light entering from the rear surface of the first light guiding plate 221 has the same effects as when passing through a parallel plane plate, so that even the light transmitted through the first light guiding plate 221 illuminates the second observation direction.

Figure 9:
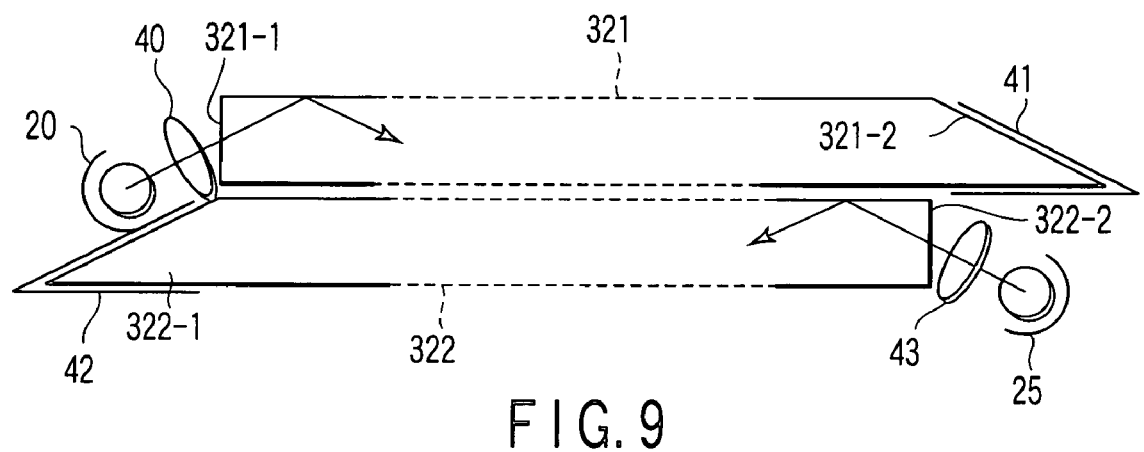
FIG. 9 is a schematic diagram showing a specific sectional structure of illumination means according to a third embodiment of the present invention.

FIG. 9 is a schematic diagram showing a specific sectional structure of illumination means according to a third embodiment of the present invention. Here, as in the configuration of FIG. 3, a first light guiding plate 321 and a second light guiding plate 322 are arranged in a stacked state. Although not shown in the drawing, a plurality of grooves as described with FIG. 8 are provided in the front surface of the light guiding plates 321 and 322.

First, the configuration of the first light guiding plate 321 will be described. Focusing attention on an end face 321-1 from which light from the first light source 20 enters and on the end faces of the groove portions from which the light exits, these end faces are parallel, so the first light guiding plate 321 has the same effects as when passing through a parallel plane plate. That is, the entrance angle coincides with the exit angle, so that if the optical axis of an illumination optical system 40 has a predetermined angle to the end face 321-1 of the first light guiding plate 321 in accordance with the exit angle, it is possible to efficiently cause the light to exit at a desired position.

Furthermore, when an end face 321-2 opposite to the first light source 20 is vertical to a horizontal surface, the light which has reached the end face 321-2 is reflected and acts as returning light, and may be the cause of the crosstalk. Therefore, here, the end face 321-2 is wedge-shaped as shown in the drawing, and its surface is covered with a light absorbing member 41, such that the crosstalk can be reduced.

In the configuration of the second light guiding plate 322 as well, the optical axis of an illumination optical system 43 has a predetermined angle to an end face 322-2 of the second light guiding plate 322 in accordance with the exit angle, and an end face 322-1 is wedge-shaped and its surface is covered with a light absorbing member 42.

Figure 10:
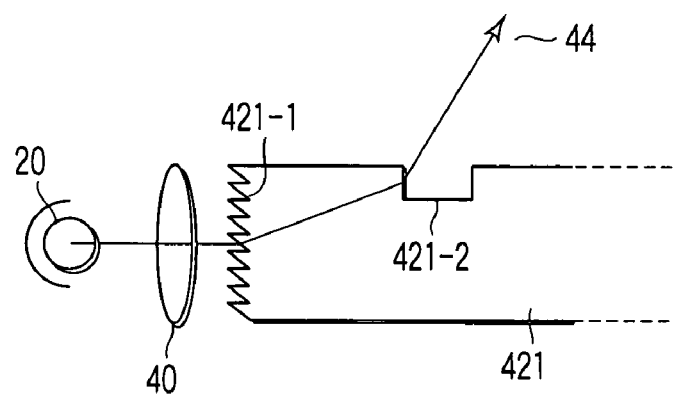
FIG. 10 is a schematic diagram showing a specific sectional structure of illumination means according to a fourth embodiment of the present invention.

FIG. 10 is a schematic diagram showing a specific sectional structure of illumination means according to a fourth embodiment of the present invention. The whole illumination optical system is inclined with respect to the end face of the first light guiding plate in the third embodiment, but an end face 421-1 of a light guiding plate 421 on the incident side has a shape of minute prisms in the fourth embodiment, such that a ray 44 which has entered the light guiding plate 421 from the light source 20 changes its angle toward the front surface, and it is thus possible to cause the light to exit at a proper angle when exiting from the end face of a groove 421-2. If it is desired to cause the light to exit in a direction angled at 30° from a direction vertical to the light guiding plate 421, the vertical angle of the prism is desirably about 10° to 20°. The illumination optical system 40 here may be anything as long as it is a collimator lens, or a prism sheet or a diffraction element which condenses the ray 44.

Figure 11:
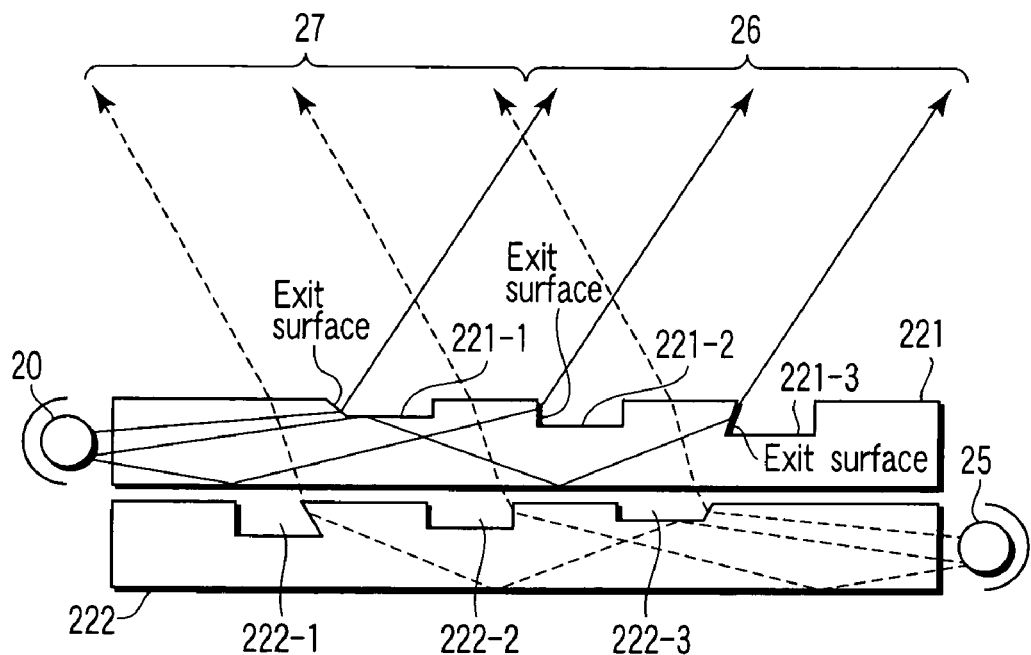
FIG. 11 is a diagram showing a modification of the configuration explained with FIG. 10.

FIG. 11 is a diagram showing a modification of the configuration explained with FIG. 10. This configuration is characterized in that walls on one side are not vertical but are inclined in the plurality of grooves 221-1 to 221-3 of the first light guiding plate 221 and the plurality of grooves 222-1 to 222-3 of the second light guiding plate 222.

Figure 12:
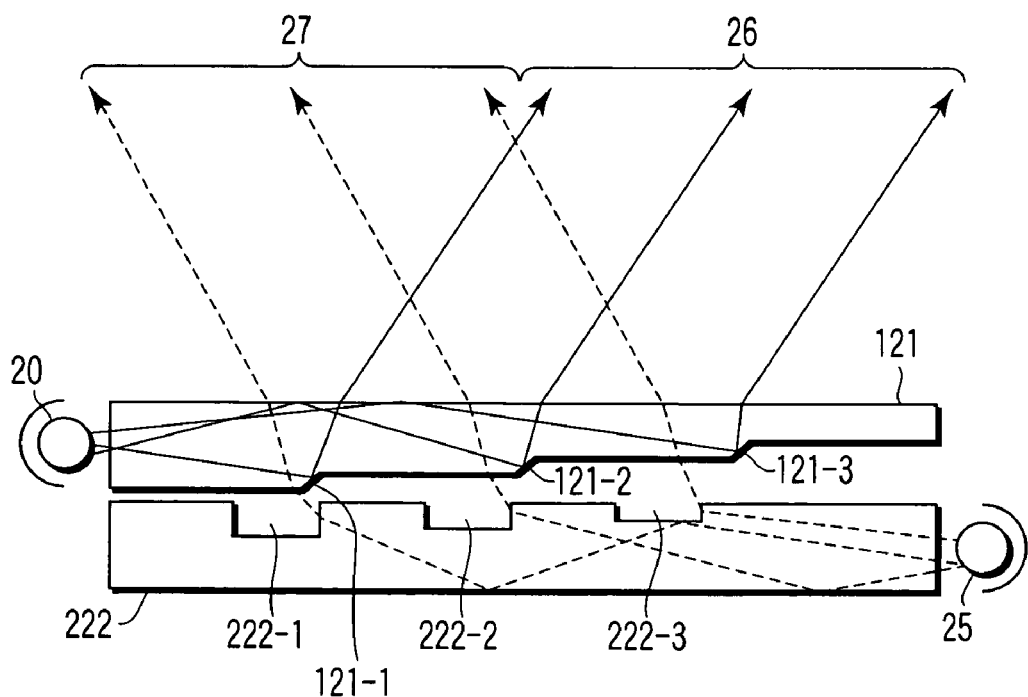
FIG. 12 is a diagram showing, as a fifth embodiment of the present invention, an example of the combination of a first light guiding plate 121 explained with reference to FIG. 4 and a second light guiding plate 222 explained with reference to FIG. 7 which have different structures.

While the first light guiding plates and the second light guiding plate have been described above in the respective embodiments, the light guiding plates in different embodiments may be used in arranging the first light guiding plate and the second light guiding plate. FIG. 12 shows, as a fifth embodiment of the present invention, an example of the combination of the first light guiding plate 121 explained with reference to FIG. 4 and the second light guiding plate 222 explained with reference to FIG. 7 which have different structures. The first light guiding plate 121 has to have a structure which transmits the light exiting from the second light guiding plate 222, but the second light guiding plate 222 does not have to be the same as the first light guiding plate 121, and any light guiding plate can be used as long as illumination having a directivity can be obtained.

Figure 13:
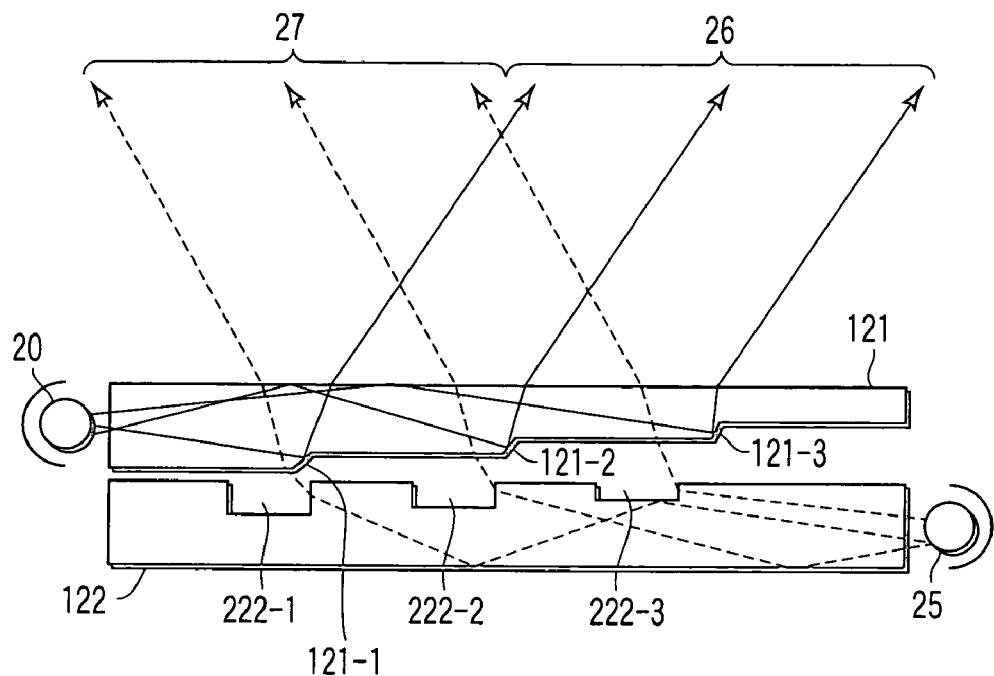
FIG. 13 is a diagram showing a modification of the configuration explained with FIG. 12.

FIG. 13 is a diagram showing a modification of the configuration explained with FIG. 12. This configuration is characterized in that the angles of the slope portions 121-1 to 121-3 of the first light guiding plate 121 increase as the distance increases from the first light source 20. In the same manner, the angles of the slope portions 222-1 to 222-3 of the second light guiding plate 122 increase as the distance increases from the second light source 25.

Figure 14:
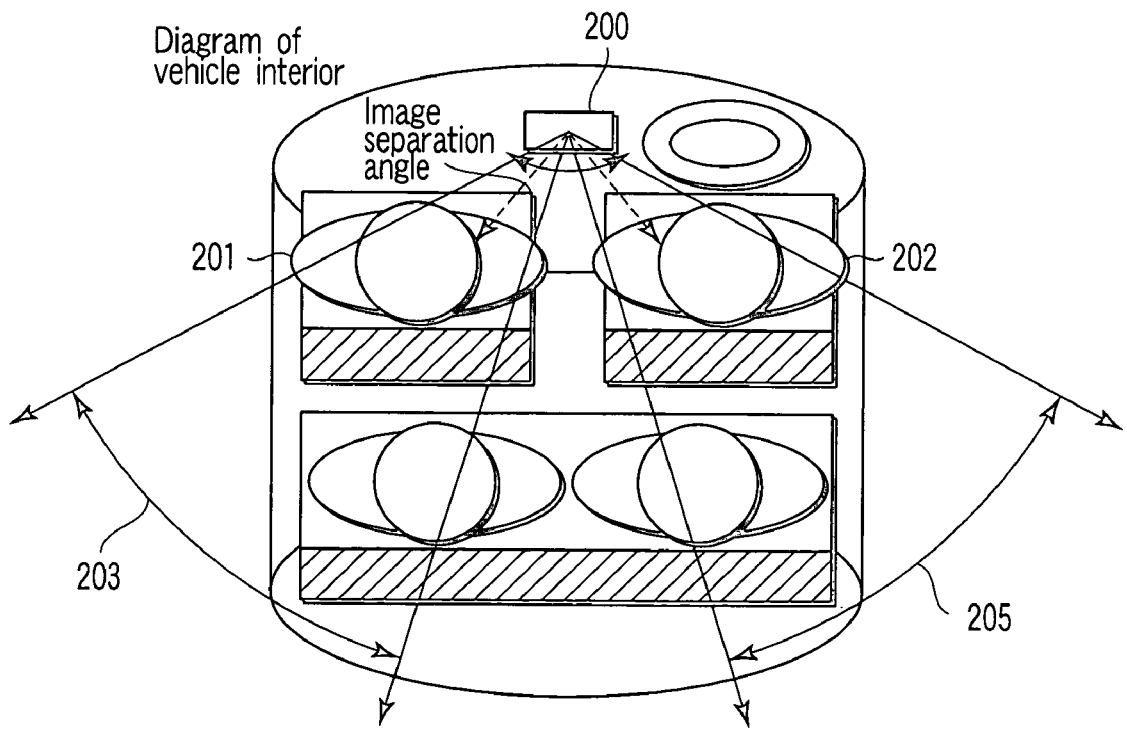
FIG. 14 is a diagram showing an example in which the image display apparatus of the present invention is installed as an in-vehicle monitor 200.

FIG. 14 shows an example in which the image display apparatus of the present invention is installed as an in-vehicle monitor 200 in a vehicle. A passenger seat is set at the position of a first observer 201 and a driver's seat is set at the position of a second observer 202, such that an observation range 203 of a first image and an observation range 205 of a second image are determined, thereby making it possible to observe images corresponding to a passenger in the passenger seat and a driver. For example, while it is possible to provide the driver with images of car navigation equipment and driving assisting images, it is possible to provide the passenger in the passenger seat with various images such as TV images, DVD images, games, and various information retrievals. Thus, the TV images and movies for which viewing during driving is regulated can be provided only to the passenger seat, so that the passenger in the passenger seat can view the images such as the TV images and movies even during the movement of the vehicle.

Figure 15:
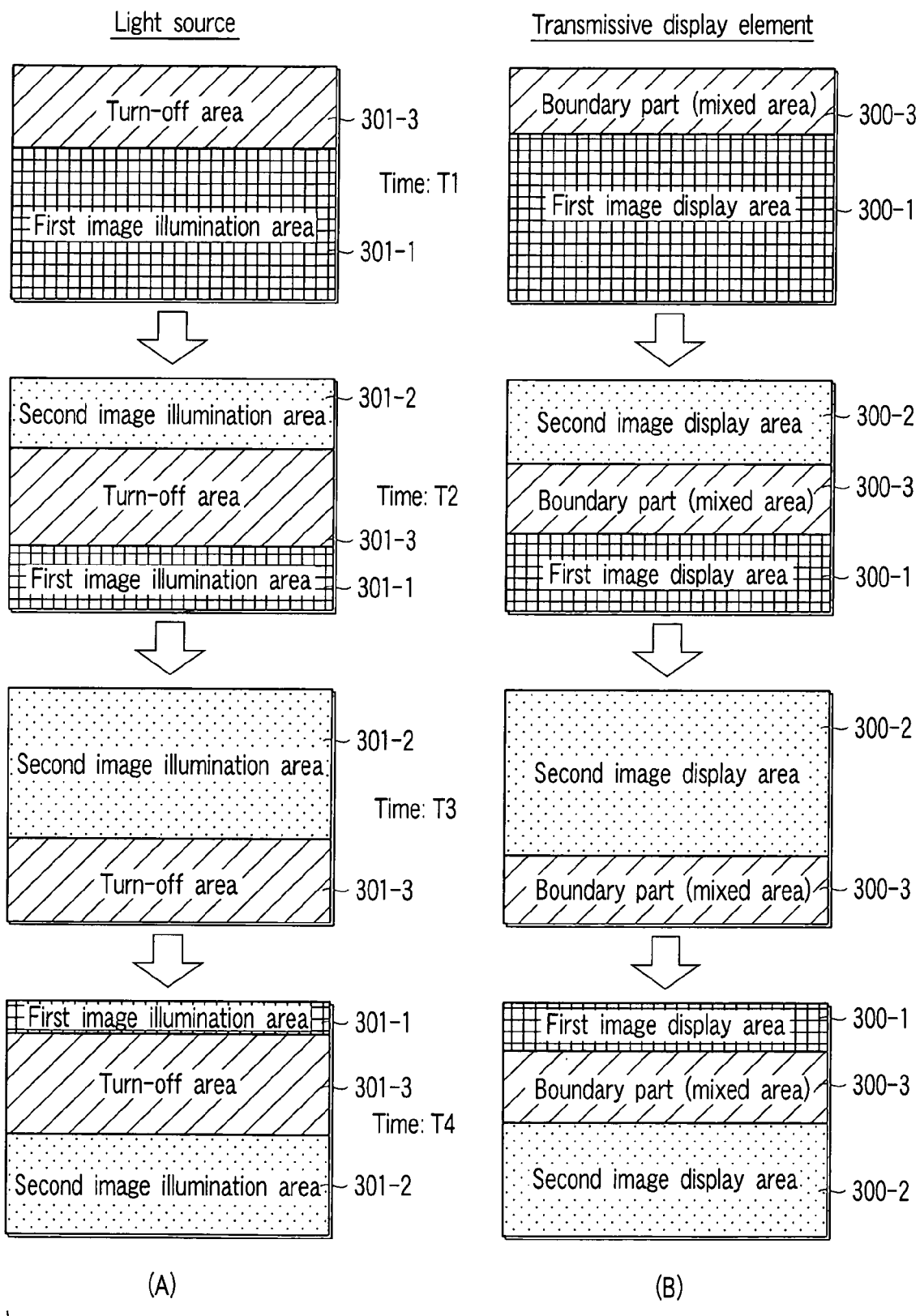
FIG. 15 is a diagram for explaining display control of a display screen considering "raster scan" and "hold characteristics" when a liquid crystal display element is used as a transmissive display element 24.

(A) and (B) in FIG. 15 are diagrams for explaining display control of the display screen considering "raster scan" and "hold characteristics" when a liquid crystal display element is used as the transmissive display element. (B) of FIG. 15 shows how the first image and the second image displayed on the transmissive display element 24 by raster scan change in accordance with the passage of time (T1 to T4). 300-1 denotes a first image display area, 300-2 denotes a second image display area, and 300-3 denotes a boundary part where the first image and the second image are mixed.

When the liquid crystal display element is used, its hold characteristics have to be considered, in contrast with a CRT display. That is, if attention is focused on a certain pixel, the first image is continuously displayed during a period from the display of the first image in the first image display area 300-1 to the next display of the second image in the second image display area 300-2. In ordinary image display, one image alone is displayed in one screen, so that the second image is an image displayed one frame after the first image, that is, an image displayed after 1/60 seconds in the case of 60 frames per second. In that case, there are few problems in the observation of the images even if a backlight is always turned on.

However, in the case where the images displayed in one screen are switched and viewed in a time sharing manner in accordance with the viewing directions of the observers as in the present invention, first image illumination is required when the first image is displayed and second image illumination is required when the second image is displayed. However, illumination with the first image illumination is inadvertently performed when the second image is displayed, and moreover, the difference between the first image and the second image is great, such that a transition period (the boundary part 300-3 in (B) of FIG. 15) to the next image resulting from the response speed of liquid crystal is generated, and illuminating this part becomes the cause of the crosstalk.

Therefore, in the present invention, as shown in (A) of FIG. 15, it is necessary to switch between a first image illumination area 301-1 for illuminating the first image and a second image illumination area 301-2 for illuminating the second image, in synchronization with the raster scan by the transmissive display element. Further, it is desirable to turn off both illuminations in a part corresponding to the boundary part between the first image illumination area 301-1 and the second image illumination area 301-2 (a turn-off area 301-3).

Figure 16:
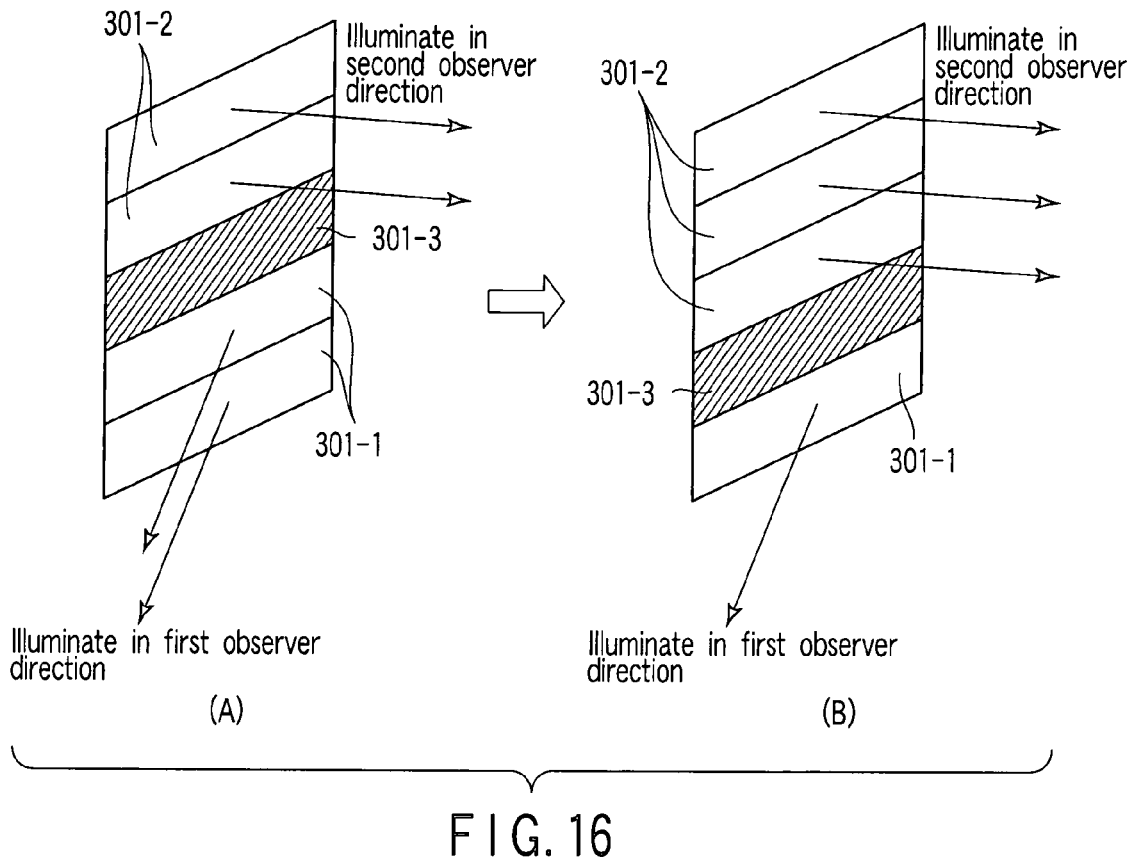
FIG. 16 is a diagram schematically showing how a first image illumination area 301-1 and a second image illumination area 301-2 are switched by a turn-off area 301-3.

(A) and (B) of FIG. 16 are diagrams schematically showing how the first image illumination area 301-1 and the second image illumination area 301-2 are switched by the turn-off area 301-3. It shows that there is a difference of directivity between the first image illumination area 301-1 and the second image illumination area 301-2. Moreover, it shows that the entire image including the turn-off area 301-3 shifts in accordance with the passage of time in synchronization with the raster scan.

Figure 17:
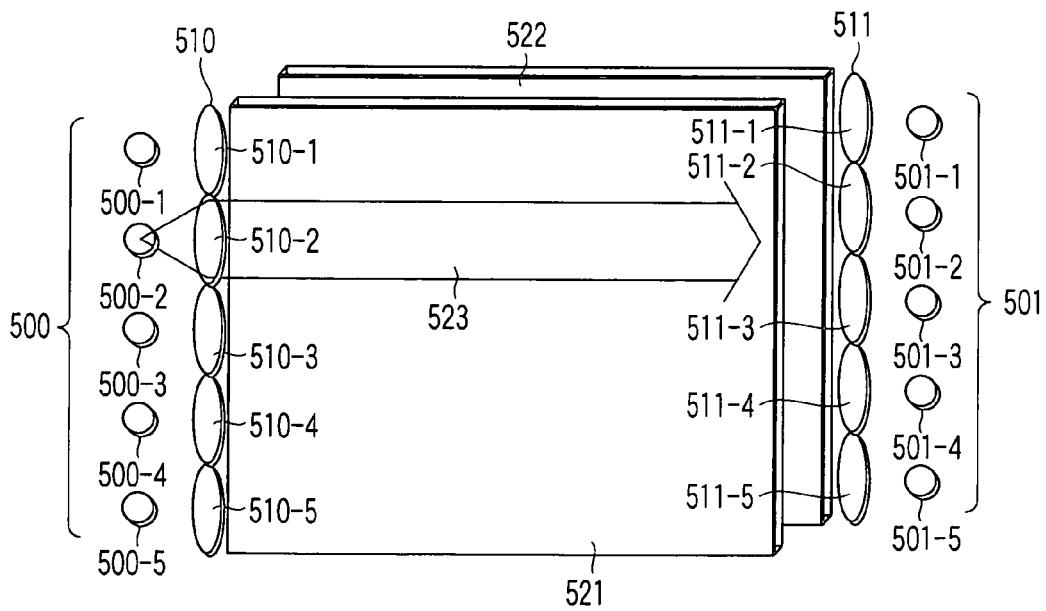
FIG. 17 is a diagram showing a modification (No. 1) of the illumination means.
Figure 19:
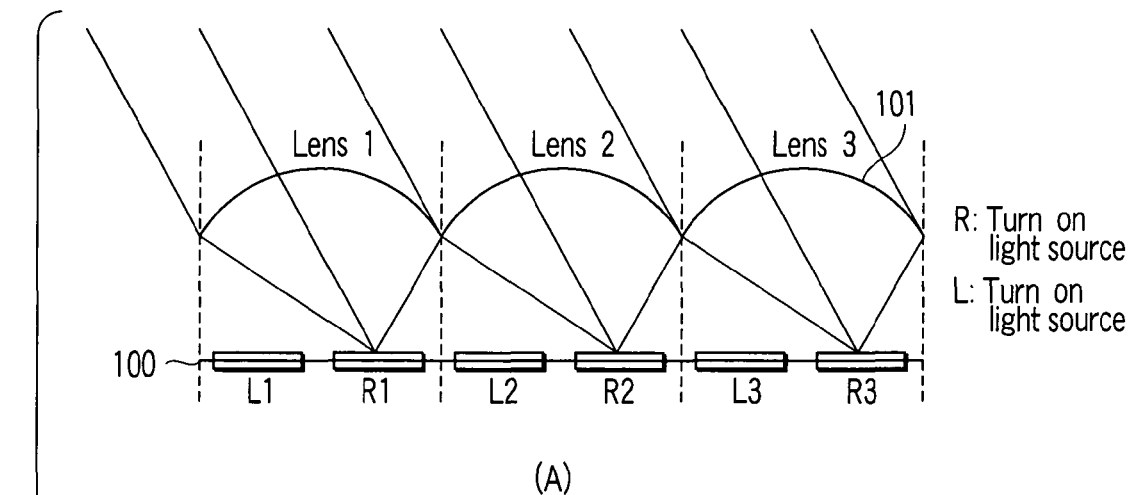
FIG. 19 is a diagram showing one example of the configuration of a conventional image display apparatus.
Figure 19:
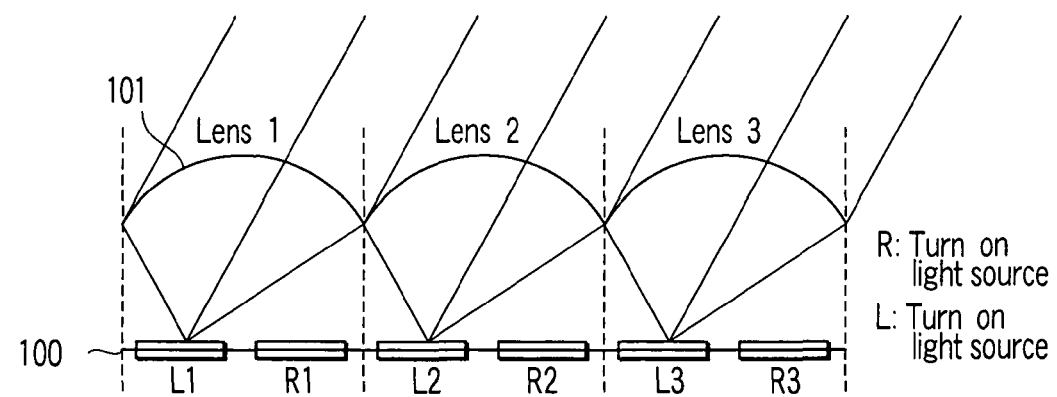
Figure 20:
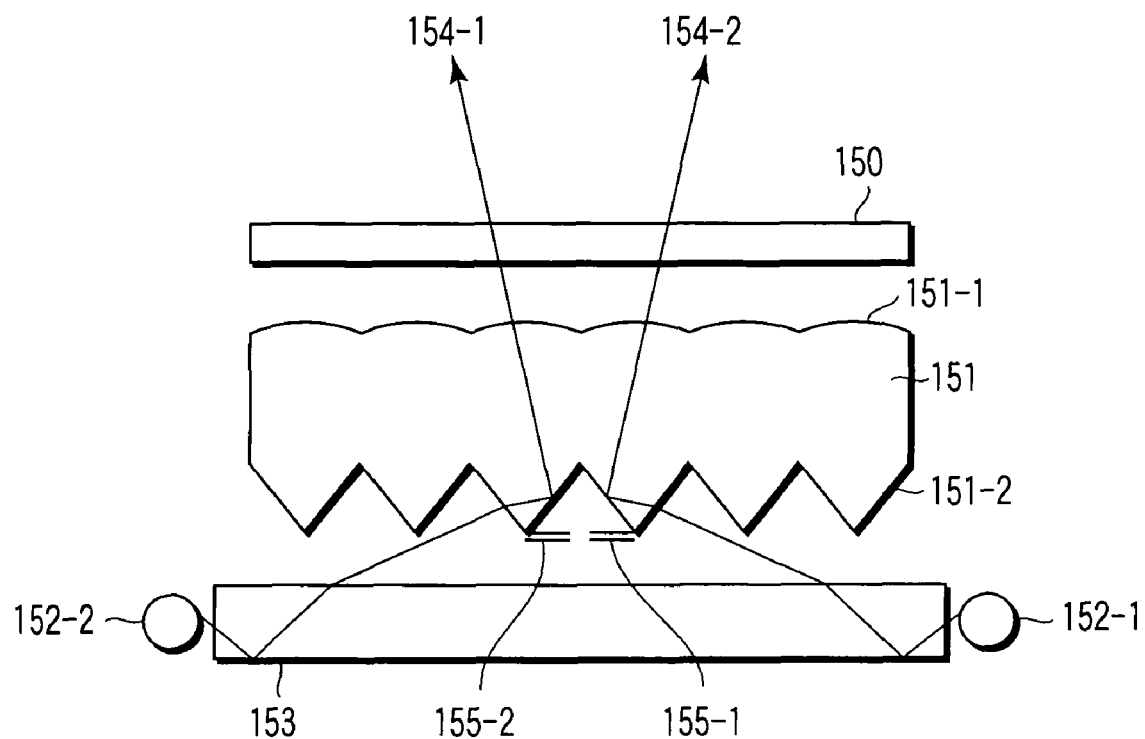
FIG. 20 is a diagram showing another example of the configuration of a conventional image display apparatus.
Figure 21:
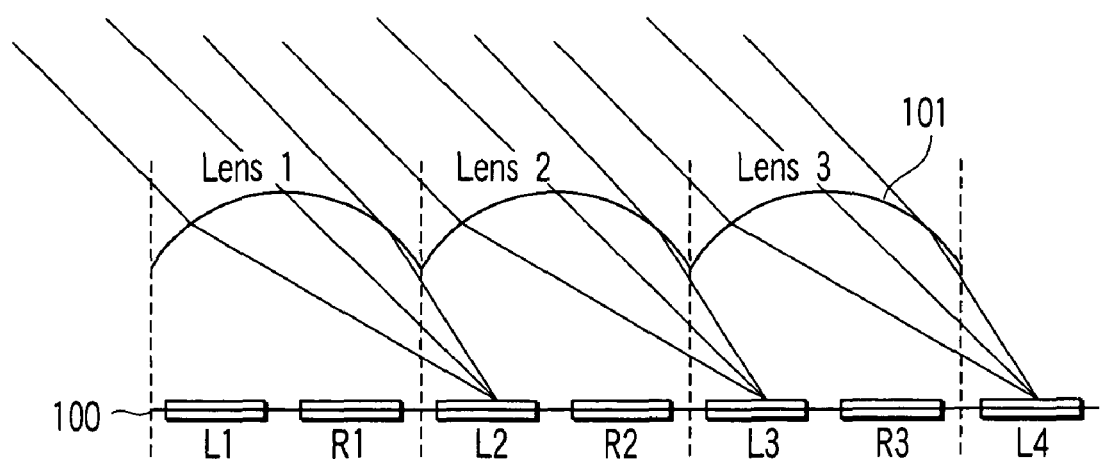
FIG. 21 is a diagram showing a situation where an observation is made further outside an observing position in (A) of FIG. 19.

It is to be noted that the embodiments described above are based on the assumption that the first and second light sources are single units having the length corresponding to the dimensions of the light guiding plates, but the present invention is not limited to such a configuration. For example, as shown in FIG. 17, it is also possible to employ a configuration in which a plurality of point light sources 500-1 to 500-5 and a plurality of illumination lenses 510-1 to 510-5 are arranged at predetermined intervals over the entire length of a first light guiding plate 521 to provide a first light source group 500 and a first illumination lens group 510. In the same manner, a plurality of point light sources 501-1 to 501-5 and a plurality of illumination lenses 511-1 to 511-5 are arranged at predetermined intervals over the entire length of a second light guiding plate 522 to provide a second light source group 501 and a second illumination lens group 511. In this case, for example, a ray exiting from the first light source group 500 is formed into illumination light 523 by the first illumination lens group 510 and then propagates within the first light guiding plate 521.

FIG. 18 is a diagram showing a modification of the configuration shown in FIG. 17. This modification is characterized by having a configuration in which the first light guiding plate 521 is cut into a plurality of light guiding plates 521-1 to 521-5 and these are bonded together and in which a plurality of light sources 502-1 to 502-5 having a length corresponding to the length of the light guiding plates 521-1 to 521-5 are adjacently arranged. The bonded parts are provided with mirror coatings to totally internally reflect the rays from the light sources 502-1 to 502-5, or mirrors are arranged to reflect the rays. Moreover, light which has entered each of the light guiding plates 521-1 to 521-5 is prevented from entering other light guiding plates 521-1 to 521-5. In such a configuration, the light sources 502-1 to 502-5 corresponding to the light guiding plates 521-1 to 521-5 are sequentially switched to emit light, thereby achieving the driving as shown in (A) and (B) of FIG. 16. It is to be noted that FIG. 16 shows an example in which both the first light guiding plate and the second light guiding plate are divided into five, but they may be divided into any number, and more divisions enable more adaptation to the raster scan and thus enable reduced crosstalk.

(Note 1)

An invention having the following configuration can be extracted from the specific embodiments described above.

1. An image display apparatus having one display screen configured to display images corresponding to a plurality of observers, the apparatus comprising:

illumination means for emitting a first light flux and a second light flux in at least two different directions in a time sharing manner; and a transmissive display element configured to display in a time sharing manner a first image using the first light flux emitted from the illumination means as illumination light and a second image using the second light flux as illumination light, wherein the illumination means includes:

a first light source which emits the first light flux;

a second light source which emits the second light flux;

a first light guiding plate which projects the first light flux emitted from the first light source only in a direction to the first observer; and a second light guiding plate which projects the second light flux emitted from the second light source only in a direction to the second observer.

Drawings of the Corresponding Embodiments

The configuration of 1 corresponds to, for example, FIG. 2 and FIG. 3.

(Effects) Illumination light having a directivity in one direction is created by one light guiding plate, and two such illumination lights are stacked, thereby achieving an illumination device capable of time sharing driving in two directions and making it possible to reduce the crosstalk in each direction.

2. The image display apparatus according to 1, wherein the first light guiding plate is disposed between the transmissive display element and the second light guiding plate, and the second light flux projected from the second light guiding plate is transmitted through the first light guiding plate.

Drawings of the Corresponding Embodiments

The configuration of 2 corresponds to, for example, FIG. 2 and FIG. 3.

(Effects) A second light flux exiting from the second light guiding plate can be transmitted through the first light guiding plate, such that two light guiding plates can be used in a stacked state. This makes it possible to remove the unevenness of illumination in each of the light guiding plates and provide the effects of image quality improvement.

3. The image display apparatus according to 2, wherein a surface of the first light guiding plate facing the transmissive display element and a surface thereof facing the second light guiding plate are provided with optically flat parts for the second light flux projected from the second light guiding plate and transmitted through the first light guiding plate.

Drawings of the Corresponding Embodiments

The configuration of 3 corresponds to, for example, FIG. 4 and FIG. 8.

(Effects)

The second light flux exiting from the second light guiding plate can be transmitted through the first light guiding plate, and there are provided optically flat parts, such that two light guiding plates can be used in a stacked state while the directivity of each light guiding plate is maintained. This makes it possible to remove the unevenness of illumination in each of the light guiding plates, reduce the influence on the crosstalk, and provide the effects of image quality improvement.

4. The image display apparatus according to 1, wherein a rear surface of the first light guiding plate is provided with:

a plurality of flat surface portions which totally internally reflect incident light from the first light source to convey the incident light to an end face of the first light guiding plate opposite to the first light source;

a plurality of slope portions which totally internally reflect the incident light from the first light source so that conditions of the total internal reflection in a front surface of the first light guiding plate are not satisfied and which project the incident light in the direction to the first observer.

Drawings of the Corresponding Embodiments

The configuration of 4 corresponds to, for example, FIG. 4 and FIG. 5.

(Effects)

The light from the light source can be transmitted to the end face of the light guiding plate owing to the total internal reflection effects in the flat surface portion provided in the rear surface of the first light guiding plate. Moreover, the light exits at a proper angle from the front surface of the light guiding plate owing to the total internal reflection effects in the plurality of slope portions that are arranged.

5. The image display apparatus according to 1, wherein a front surface of the first light guiding plate is provided with:

a plurality of flat surface portions which totally internally reflect incident light from the first light source to convey the incident light to an end face of the first light guiding plate opposite to the first light source;

a plurality of exit surfaces which transmit the incident light from the first light source so that the incident light exit in the direction to the first observer.

Drawing of the Corresponding Embodiments

The configuration of 5 corresponds to, for example, FIG. 8.

(Effects)

Light from a direction which the first light source is in can only enter the exit surface in the light guiding plate, so that the light exiting from the exit surface has a directivity to exit in a particular direction, thus reducing the crosstalk.

6. The image display apparatus according to 4, wherein an angle $\theta$ between the slope portion and the flat surface portion satisfies a condition:

$$n \cdot \cos 2\theta < 1 (\theta < 45 \text{ degrees})$$

where n is the refractive index of the first light guiding plate.

Drawing of the Corresponding Embodiments

The configuration of 6 corresponds to, for example, FIG. 5.

(Effects)

The slope portions have to have proper angles for the exit from the light guiding plate at the proper angle. For example, if $\theta$ is equal to or more than 45 degrees, the illumination light to exit in the first observation direction illuminates even the second observation direction, and becomes the cause of the crosstalk. Further, if $n \cdot \cos 2\theta > 1$, even the light totally internally reflected by the slope portions is totally internally reflected by the front surface of the light guiding plate and can not escape from the light guiding plate. Thus, when $\theta < 45$ degrees and $n \cdot \cos 2\theta < 1$, it is possible to obtain a light guiding plate with a little crosstalk and high efficiency in the use of light.

7. The image display apparatus according to 5, wherein the front surface of the first light guiding plate is provided with:

a plurality of rectangular grooves.

Drawings of the Corresponding Embodiments

The configuration of 7 corresponds to, for example, FIG. 8 and FIG. 9.

(Effects)

When light is caused to enter from one of the end faces of the light guiding plate, the light exits as illumination having a directivity slanted in a certain direction, owing to the effects of the grooves provided in the light guiding plate.

8. The image display apparatus according to 7, wherein the depth of the rectangular grooves increases as the distance increases from the first light source.

Drawings of the Corresponding Embodiments

The configuration of 8 corresponds to, for example, FIG. 8 and FIG. 9.

(Effects)

The light from the light source is taken out in the order of grooves in the light guiding plate closer to the light source, so that if the groove on the closer side of the light source has the same size as the groove on the farther side thereof, the closer side appears bright and the farther side appears dark. Thus, the size of the groove is increased as the distance increases from the light source, thereby making it possible to obtain illumination that is equal as a whole.

9. The image display apparatus according to 1, wherein the second light guiding plate has a shape different from that of the first light guiding plate or has a surface shape with a periodic structure different from that of the first light guiding plate.

Drawing of the Corresponding Embodiments

The configuration of 9 corresponds to, for example, FIG. 12.

(Effects)

The second light guiding plate which is the lower one of the stacked light guiding plates does not necessarily have to have a structure which transmits light entering from the rear surface, and it is therefore possible to use the most reliable and low-cost backlight method in which the second observer direction is only illuminated. Moreover, when the first light guiding plate and the second light guiding plate have the same shape, the influence of Moire fringes is caused in some cases, but this can be reduced if the first light guiding plate and the second light guiding plate have different shapes or periodic structures.

10. The image display apparatus according to 1, wherein the second light guiding plate has the same shape as that of the first light guiding plate, and the first light guiding plate and the second light guiding plate are disposed so that they are horizontally reverse to each other.

Drawings of the Corresponding Embodiments

The configuration of 10 corresponds to, for example, FIG. 4 and FIG. 8.

(Effects)

In this configuration, the two light guiding plates having different directivities are combined, but if the first light guiding plate is horizontally reversed, the second light guiding plate can be used in the same shape as the first light guiding plate. Therefore, it is not necessary to newly prepare one more kind of light guiding plate, thus providing the effects of cost reduction.

11. The image display apparatus according to 10, wherein the first light source and the second light source are disposed at end face positions horizontally different when viewed from the side of the observers.

Drawings of the Corresponding Embodiments

The configuration of 11 corresponds to, for example, FIG. 3, FIG. 4 and FIG. 8.

(Effects)

The position where the light source is disposed is horizontally different in each of the light guiding plates, such that it is possible to more easily achieve illuminations in two directions having different directivities. Further, the horizontal direction of each light guiding plate is only changed, so that members having a common structure can be used for the light guiding plates that are vertically located.

12. The image display apparatus according to 1, wherein the first light source and the second light source periodically generate light at different times, and the frequency of the light generated by each of the light sources is 24 Hz or more.

Drawing of the Corresponding Embodiments

The configuration of 12 corresponds to, for example, FIG. 3.

(Effects)

Periods in which both light sources are simultaneously turned on are eliminated, such that the crosstalk is reduced.

Moreover, driving the light source at 24 Hz or more can reduce the effects causing difficulty of viewing due to flicker.

13. The image display apparatus according to 1, wherein a light absorbing member is disposed in the rear of the second light guiding plate.

Drawing of the Corresponding Embodiments

The configuration of 13 corresponds to, for example, FIG. 4.

(Effects)

In contrast with ordinary diffusion-type illumination light, this configuration is characterized that illumination has a directivity. Thus, when light is generated which escapes from the light guiding plate to the rear surface opposite to the direction to the front surface, the light further exits to the observation side if the rear surface of the light guiding plate is made of a reflective member, which becomes the cause of the crosstalk. Thus, the use of a member which absorbs light generated in the direction to the rear surface enables the reduction of the crosstalk.

Furthermore, outside light such as sunlight enters the display screen, and the light reflected on the rear side of the light guiding plate becomes unnecessary light and becomes the cause of the crosstalk, so that the light absorbing member can be disposed under the second light guiding plate to reduce even the crosstalk due to the outside light.

14. The image display apparatus according to 1, wherein a plurality of light emitting elements are disposed adjacently to the first light guiding plate and the second light guiding plate along a raster scan direction of the transmissive display element, each of the light emitting elements is individually controlled for light emission.

Drawings of the Corresponding Embodiments

The configuration of 14 corresponds to, for example, FIG. 17 and FIG. 18.

(Effects)

Since a plurality of light emitting elements are arranged along the raster scan direction of the transmissive display element, illumination synchronous with the raster scan is possible, and the effects of luminance improvement can be obtained because the crosstalk is low and long light emission time can be kept.

15. The image display apparatus according to 14, wherein each of the light emitting elements periodically emits light synchronously with a raster scan by the transmissive display element.

Drawings of the Corresponding Embodiments

The configuration of 15 corresponds to, for example, FIG. 17 and FIG. 18.

(Effects)

Illumination synchronous with the raster scan is possible, and the effects of luminance improvement can be obtained because the crosstalk is low and long light emission time can be kept.

16. The image display apparatus according to 14, wherein the first light guiding plate and the second light guiding plate are divided into a plurality of light guiding portions to correspond to the plurality of light emitting elements.

Drawing of the Corresponding Embodiments

The configuration of 16 corresponds to, for example, FIG. 18.

(Effects)

In order to prevent the light emitted by one of the plurality of light emitting elements from leaking to other light emitting elements and becoming the cause of the crosstalk, the light guiding plate is divided for each of the light emitting elements. This makes it possible to reduce the crosstalk.

17. An in-vehicle image display apparatus which is installed in a vehicle and which has one display screen configured to display images corresponding to a plurality of observers, the apparatus comprising:

illumination means for emitting a first light flux and a second light flux in at least two different directions in a time sharing manner; and a transmissive display element configured to display in a time sharing manner a first image using the first light flux emitted from the illumination means as illumination light and a second image using the second light flux as illumination light, wherein the illumination means includes:

a first light source which emits the first light flux;

a second light source which emits the second light flux;

a first light guiding plate which projects the first light flux emitted from the first light source only in a direction to an observer on the side of a driver's seat; and a second light guiding plate which projects the second light flux emitted from the second light source only in a direction to an observer on the side of a passenger seat.

Drawing of the Corresponding Embodiments

The configuration of 17 corresponds to, for example, FIG. 14.

(Effects)

Effects equivalent to those in the configuration of 1 described above can be obtained.

INDUSTRIAL APPLICABILITY

According to the present invention, it is possible to obtain high-quality images with a little crosstalk and a little unevenness of illumination at low cost.

The invention claimed is:

1. An image display apparatus having one display screen configured to display images corresponding to a plurality of observers, the apparatus comprising:

illumination means for emitting a first light flux and a second light flux in at least two different directions in a time sharing manner; and a transmissive display element configured to display in a time sharing manner a first image using the first light flux emitted from the illumination means as illumination light and a second image using the second light flux as illumination light, wherein the illumination means includes:

a first light source which emits the first light flux;

a second light source which emits the second light flux;

a first light guiding plate which projects the first light flux emitted from the first light source only in a direction to a first observer; and a second light guiding plate which projects the second light flux emitted from the second light source only in a direction to a second observer;

wherein a plurality of light emitting elements are disposed adjacently to the first light guiding plate and the second light guiding plate along a raster scan direction of the transmissive display element; and wherein each of the light emitting elements is individually controlled for light emission.

2. The image display apparatus according to claim 1, wherein the first light guiding plate is disposed between the transmissive display element and the second light guiding plate, and the second light flux projected from the second light guiding plate is transmitted through the first light guiding plate.

3. The image display apparatus according to claim 2, wherein a surface of the first light guiding plate facing the transmissive display element and a surface thereof facing the second light guiding plate are provided with optically flat parts for the second light flux projected from the second light guiding plate and transmitted through the first light guiding plate.

4. The image display apparatus according to claim 1, wherein a rear surface of the first light guiding plate is provided with:

a plurality of flat surface portions which totally internally reflect incident light from the first light source to convey the incident light to an end face of the first light guiding plate opposite to the first light source; and a plurality of slope portions which totally internally reflect the incident light from the first light source so that conditions of the total internal reflection in a front surface of the first light guiding plate are not satisfied and which project the incident light in the direction to the first observer.

5. The image display apparatus according to claim 1, wherein a front surface of the first light guiding plate is provided with:

a plurality of flat surface portions which totally internally reflect incident light from the first light source to convey the incident light to an end face of the first light guiding plate opposite to the first light source; and a plurality of exit surfaces which transmit the incident light from the first light source so that the incident light exits in the direction to the first observer.

6. The image display apparatus according to claim 4, wherein an angle θ between the slope portion and the flat surface portion satisfies a condition:

$$n \cdot \cos 2\theta < 1 (\theta < 45 \text{ degrees})$$

where n is the refractive index of the first light guiding plate.

7. The image display apparatus according to claim 5, wherein the front surface of the first light guiding plate is provided with a plurality of rectangular grooves.

8. The image display apparatus according to claim 7, wherein the depth of the rectangular grooves increases as the distance increases from the first light source.

9. The image display apparatus according to claim 1, wherein the second light guiding plate has a shape different from that of the first light guiding plate or has a surface shape with a periodic structure different from that of the first light guiding plate.

10. The image display apparatus according to claim 1, wherein the second light guiding plate has the same shape as that of the first light guiding plate, and the first light guiding plate and the second light guiding plate are disposed so that they are horizontally reverse to each other.

11. The image display apparatus according to claim 10, wherein the first light source and the second light source are disposed at end face positions horizontally different when viewed from a side of the observers.

12. The image display apparatus according to claim 1, wherein the first light source and the second light source periodically generate light at different times, and the frequency of the light generated by each of the light sources is 24 Hz or more.

13. The image display apparatus according to claim 1, wherein a light absorbing member is disposed at a rear of the second light guiding plate.

14. The image display apparatus according to claim 1, wherein each of the light emitting elements periodically emits light synchronously with a raster scan by the transmissive display element.

15. The image display apparatus according to claim 1, wherein the first light guiding plate and the second light guiding plate are divided into a plurality of light guiding portions to correspond to the plurality of light emitting elements.

16. An in-vehicle image display apparatus which is installed in a vehicle and which has one display screen configured to display images corresponding to a plurality of observers, the apparatus comprising:
    illumination means for emitting a first light flux and a second light flux in at least two different directions in a time sharing manner; and
    a transmissive display element configured to display in a time sharing manner a first image using the first light flux emitted from the illumination means as illumination light and a second image using the second light flux as illumination light,
wherein the illumination means includes:
    a first light source which emits the first light flux;
    a second light source which emits the second light flux;
    a first light guiding plate which projects the first light flux emitted from the first light source only in a direction to an observer on a side of a driver's seat; and
    a second light guiding plate which projects the second light flux emitted from the second light source only in a direction to an observer on a side of a passenger seat;
    wherein a plurality of light emitting elements are disposed adjacently to the first light guiding plate and the second light guiding plate along a raster scan direction of the transmissive display element; and
    wherein each of the light emitting elements is individually controlled for light emission.

* * * * *

UNITED STATES PATENT AND TRADEMARK OFFICE
CERTIFICATE OF CORRECTION

PATENT NO. : 7,800,710 B2
APPLICATION NO. : 11/630743
DATED : September 21, 2010
INVENTOR(S) : Ryohei Sugihara It is certified that error appears in the above-identified patent and that said Letters Patent is hereby corrected as shown below:

On the Title page:

Item (30) Foreign Application Priority Data;

Change "2004-196286" to --2004-186286--.

Signed and Sealed this

Twenty-first Day of December, 2010

David J. Kappos
*Director of the United States Patent and Trademark Office*